(12) United States Patent
Vissamsetty et al.

(10) Patent No.: US 10,609,074 B2
(45) Date of Patent: Mar. 31, 2020

(54) IMPLEMENTING DECOYS IN NETWORK ENDPOINTS

(71) Applicant: Attivo Networks Inc., Fremont, CA (US)

(72) Inventors: Venu Vissamsetty, San Jose, CA (US); Muthukumar Lakshmanan, Bangalore (IN); Harinath Vishwanath Ramchetty, Bengaluru (IN); Vinod Kumar A. Porwal, Bangalore (IN)

(73) Assignee: ATTIVO NETWORKS INC., Fremont, CA (US)

( * ) Notice: Subject to any disclaimer, the term of this patent is extended or adjusted under 35 U.S.C. 154(b) by 267 days.

(21) Appl. No.: 15/360,117

(22) Filed: Nov. 23, 2016

(65) Prior Publication Data

US 2018/0146008 A1     May 24, 2018

(51) Int. Cl.
*H04L 29/06* (2006.01)
*H04L 12/46* (2006.01)
*H04L 29/12* (2006.01)

(52) U.S. Cl.
CPC ...... *H04L 63/1491* (2013.01); *H04L 12/4633* (2013.01); *H04L 63/0209* (2013.01); *H04L 61/2015* (2013.01)

(58) Field of Classification Search
CPC ............. H04L 63/1491; H04L 12/4633; H04L 63/0209; H04L 61/2015
See application file for complete search history.

(56) References Cited

U.S. PATENT DOCUMENTS

| | | | | |
|---|---|---|---|---|
| 8,713,306 | B1* | 4/2014 | Bennett | H04L 63/1491 370/252 |
| 8,821,242 | B2* | 9/2014 | Hinman | A63F 13/10 273/236 |
| 2002/0194489 | A1* | 12/2002 | Almogy | G06F 21/554 726/24 |
| 2006/0203774 | A1* | 9/2006 | Carrion-Rodrigo | H04L 29/12066 370/331 |

* cited by examiner

*Primary Examiner* — Harunur Rashid
(74) *Attorney, Agent, or Firm* — David R. Stevens; Stevens Law Group

(57) ABSTRACT

Endpoints of various domains implement forwarding modules as well as perform various production tasks. The endpoints of a domain participate in an election process by which one or more endpoints are selected to operate as honeypots. The forwarding modules of non-selected endpoints become inactive, but wake up periodically to determine whether an election process is occurring. Selected endpoints obtain configuration data from a management server. The endpoints then acquire IP addresses and implement one or more services according to the configuration data. The management server may configure the services based on a location of the selected endpoint. Traffic received by the selected endpoints is forwarded to the management server, which engages an attacker system using one or more VMs. When an endpoint moves to a different domain, it releases acquired IP addresses and attempts to participate in the election process in the different domain.

19 Claims, 4 Drawing Sheets

IMPLEMENTING DECOYS IN NETWORK ENDPOINTS

BACKGROUND

Honeypots are decoy computer systems that are set up to gather information and intent of an attacker. Normally, users place honeypots at various locations, such as inside enterprise networks, a DMZ (demilitarized zone), external public facing honeypots, etc. When a honeypot is deployed, an IP address must be assigned to the honeypot so that these systems are visible in the network. Large enterprises normally have thousands of networks and these might be spread across a variety of geographic locations.

The system and methods disclosed herein provide a highly-scalable approach to implementing honeypots.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
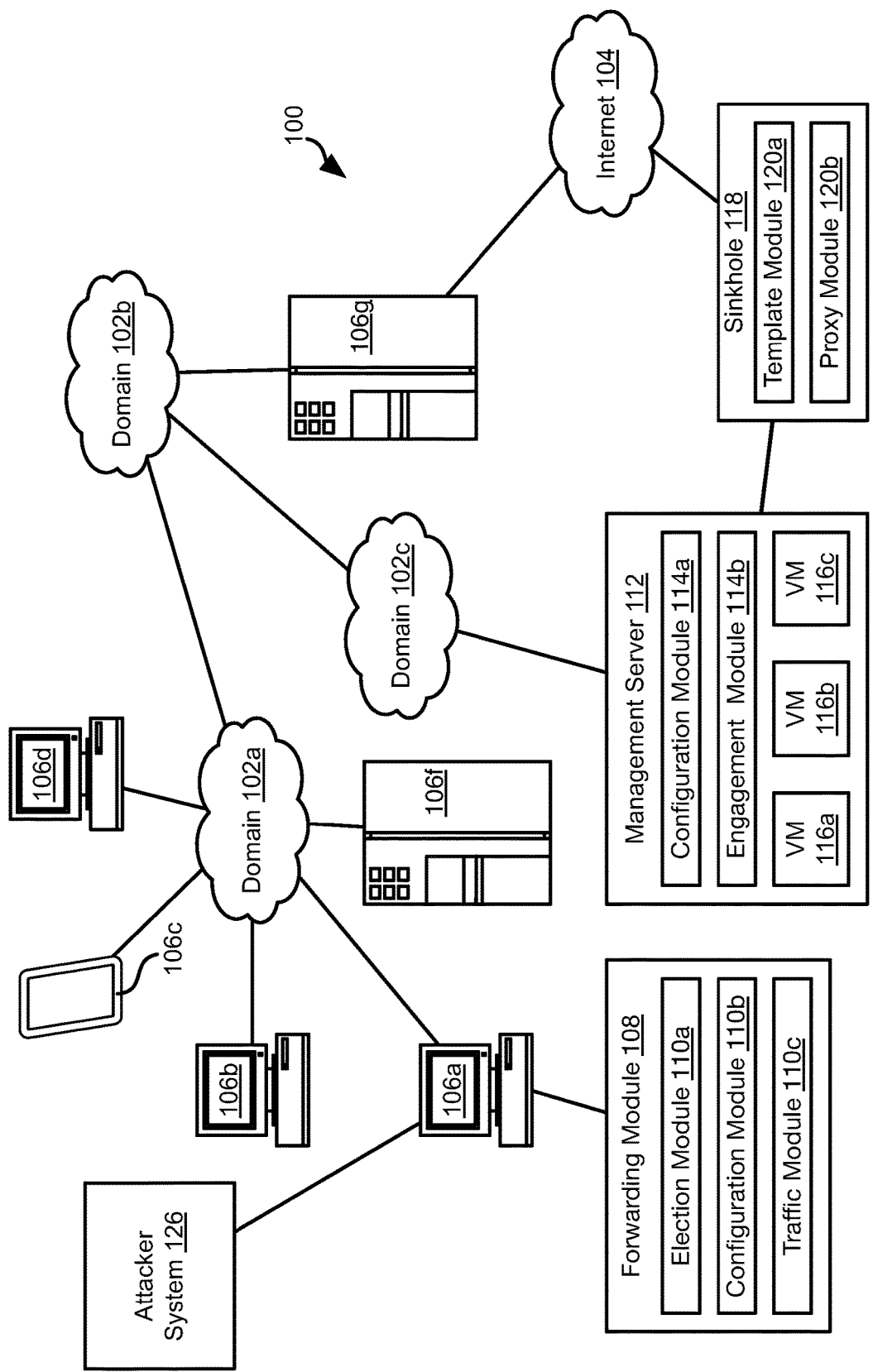
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the methods disclosed herein may be practiced in a network environment 100 including a plurality of domains 102a-102c. The domains 102a-102c may be any network division, such as a subnet, local area network (LAN), virtual local area network (VLAN), or the like. The domains 102a-102c may be distributed within a same building or over a large geographic area with interconnecting links including the Internet 104. The illustrated domains 102a-102c may represent one or more network components, such as routers, switches, servers, and the like that implement routing of traffic within the domains 102a-102c and control traffic flowing into and out of the domains 102a-102c Each domain may include one or more endpoints 106a-106g. The endpoints 106a-106g are production computing devices that operate as personal computers for users or servers providing production services to other endpoints or to external computers accessing the network environment by way of the internet 104. The endpoints 106a-106g may be desktop or laptop computers, mobile phones, tablet computers, server computers, and any other type of computing device. Some endpoints 106a-106g may include internet-enabled devices, i.e. so-called internet of things (IoT) devices that are often a vulnerability.

The endpoints 106a-106g are not dedicated honeypots, but rather perform non-decoy functions and process legitimate production data and legitimate production tasks of an enterprise, such as functioning as user computers executing applications such as word processors, browsers, graphics programs etc. The endpoints 106a-106g may also function as web servers, database servers, remote login servers, application servers, and the like.

In addition, to applications and other data for implementing production functions, some or all of the endpoints 106a-106g execute a forwarding module 108. The forwarding module 108 enables the endpoints 106a-106g to function as honeypots in addition to implementing production functions, as described herein.

The forwarding modules 108 may include an election module 110a. Having every endpoint in the network environment 100 function as a honeypot may generate too much traffic and consume too much computing resources to be practical. Accordingly, the election module 110a may participate in an election process with the election modules 110a of other endpoints 106b-106d in the same domain 102a as an endpoint 106a. The result of the election process may be selection of a single endpoint 106a-106d to function as a honeypot or the selection of multiple endpoints 106a-106d. The election process may include any arbitration process known in the art enabling the automated selection of one or more components.

The forwarding module 108 may further include a configuration module 110b. Where the endpoint 106a is selected to function as a honeypot as a result of the election process, the configuration module 110b may download configuration information from a management server 112. The configuration module may include decoy IP (internet protocol) addresses that the endpoint 106a should acquire, hostnames for the decoy IP addresses, instructions to simulate one or more network services on one or more ports, or other instructions defining the function of the endpoint 106a as a honeypot. The endpoint 106a processes the configuration instructions to acquire the decoy IP addresses in the local domain, configure the hostnames for the decoy IP addresses in the domain 102a, implement the simulated network services, or perform other functions defined by the configuration data without impacting end-point systems.

The forwarding module 108 may further include a traffic module 110c that receives traffic referencing the decoy IP address and forwards the traffic to the management server 112. In some embodiments, the traffic module 110c forwards the traffic over a GRE (generic routing encapsulation) tunnel, IP tunnel or other secure tunnel to the management server 112.

The management server 112 may execute a configuration module 114a that transmits the configuration information described above to the endpoints 106a that are elected to function as honeypots. The management server 112 further executes an engagement module 114b that receives traffic forwarded by the traffic modules 110c of the endpoint 106a and engages any attacker system 122 that may be attempting to exploit the endpoint 106a. For example, the management server 112 may execute one or more virtual machines (VM) 116a-116c that are configured as a simulated private network and implement one or more simulated network services. The engagement module 114b may receive the forwarded traffic and input it to one of the VMs 116a-116c. Actions performed by the attacker system 122 or in response to instructions or malicious code received from the attacker system 122 may be monitored by the management server 112.

The manner in which the engagement module 114b processes the forwarded traffic in order to engage an attacker system 122 may be according to any of the methods disclosed in the following applications (herein after "the incorporated applications"), which are hereby incorporated herein by reference in their entirety:

U.S. application Ser. No. 14/458,026, filed Aug. 12, 2014, and entitled DISTRIBUTED SYSTEM FOR BOT DETECTION;

U.S. application Ser. No. 14/466,646, filed Aug. 22, 2014, and entitled EVALUATING URLS FOR MALICIOUS CONTENT;

U.S. application Ser. No. 14/549,112, filed Nov. 20, 2014, and entitled METHOD FOR DIRECTING MALICIOUS ACTIVITY TO A MONITORING SYSTEM;

U.S. application Ser. No. 15/157,082, filed May 17, 2016, and entitled EMULATING SUCCESSFUL SHELLCODE ATTACKS;

U.S. application Ser. No. 14/805,202, filed Jul. 21, 2015, and entitled MONITORING ACCESS OF NETWORK DARKSPACE;

U.S. application Ser. No. 14/965,574, filed Dec. 10, 2015, and entitled DATABASE DECEPTION IN DIRECTORY SERVICES;

U.S. application Ser. No. 15/142,860, filed Apr. 29, 2016, and entitled AUTHENTICATION INCIDENT DETECTION AND MANAGEMENT;

U.S. application Ser. No. 15/153,471, filed May 12, 2016, and entitled LURING ATTACKERS TOWARDS DECEPTION SERVERS; and U.S. application Ser. No. 15/204,779, filed Jul. 7, 2016, and entitled DETECTING MAN-IN-THE-MIDDLE ATTACKS;

In some instances, malicious code executing in one of the VMs 116a-116c or an instruction received from an attacker system 122 may result in outbound traffic from the VMs 116a-116c. In such cases, the outbound traffic may be routed to a sinkhole 118. The sinkhole 118 may respond to the traffic, such as using a template module 120a that defines templates of data and actions that may be used to simulate a response to such traffic. The sinkhole 118 may also include a proxy module 120b that acts a proxy to the internet 104 and permits communication outside of the management server 112 and sinkhole 118. The sinkhole 118 may modify such traffic. The operation of the sinkhole 118 may include some or all of the functions of the sinkhole described in U.S. application Ser. No. 14/458,026.

Figure 2:
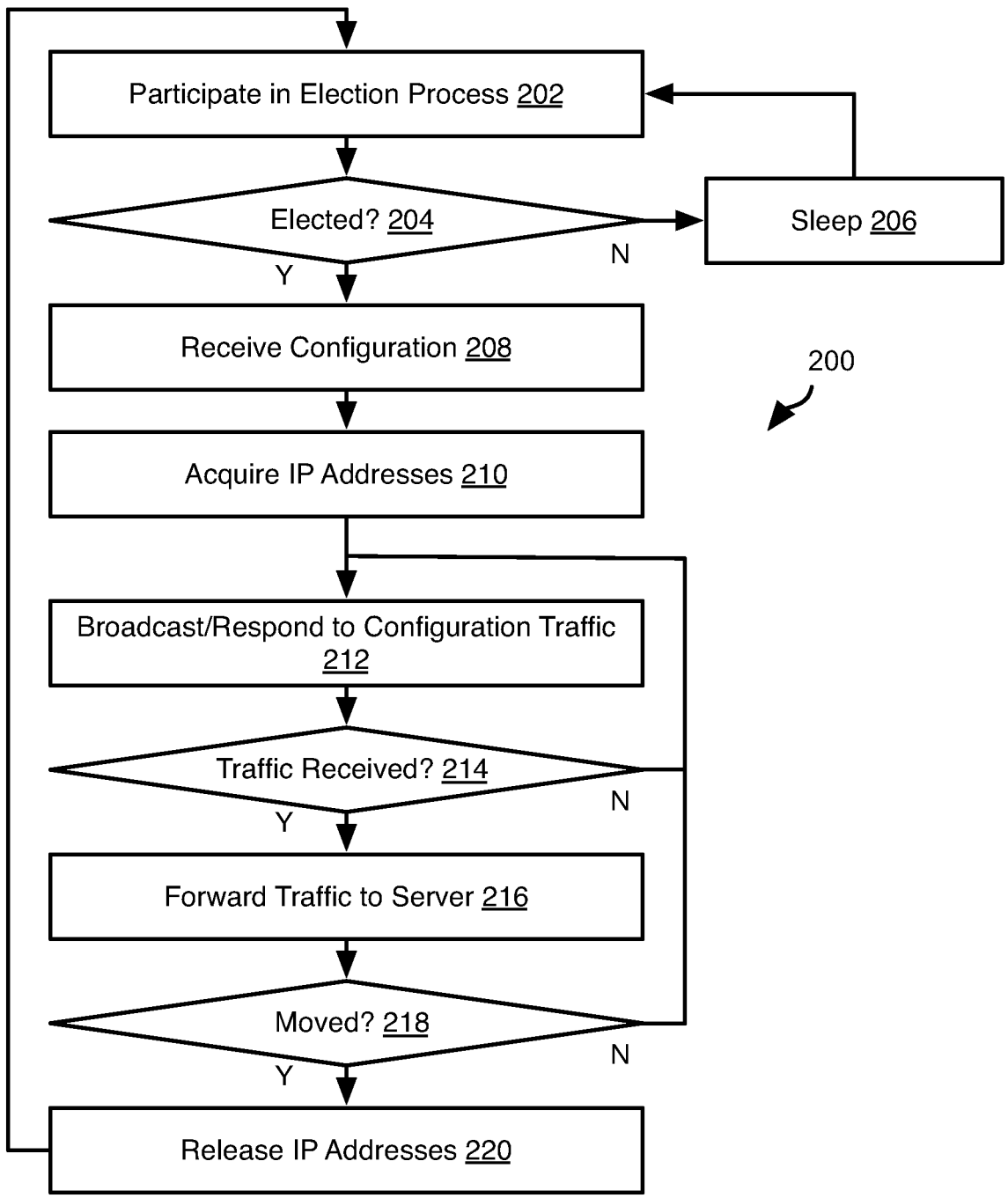
FIG. 2 is a process flow diagram of a method for implementing a decoy forwarder using a network endpoint in accordance with an embodiment of the present invention.

Referring to FIG. 2, the forwarding modules 108 executing on some or all of the endpoints 106a-106g may each execute the illustrated method 200 in order to selectively function as a honeypot. The method 200 may include participating 202, by the endpoint, in an election process. Participating 202 in an election process may include discovering other endpoints in the domain of the endpoint, such as by broadcasting a message indicating the presence of the endpoint and receiving broadcast messages from the other endpoints. The endpoints of the domain may then communicate with one another, using the information in the broadcast messages, to select a single endpoint, a fixed number of endpoints greater than one, or a percentage of the endpoints to function as a honeypot. The manner in which the endpoints communicate with one another and coordinate to select one or more endpoints to function as a honeypot may include any arbitration scheme known in the art.

In another embodiment, participating 202 in the election process may include the election module 110a contacting the management server 112 and communicating its intention to participate in an election process. The management server 112 keeps track of all end-points across each domain from which such notifications have been received. The management server 12 then executes an algorithm to determine which endpoint to select for each domain. The selected endpoint will then be notified by the management server if it is selected. The notification may include the configuration information described below with respect to step 208.

If the endpoint is not found 204 to have been selected as a result of the election process of step 202, then the forwarding module 108 may sleep 206, e.g., be paused or otherwise made dormant for a wait period. After the wait period, the forwarding module 108 may activate or be reactivated, such as by an operating system of the endpoint, and again seek to participate in the election process 202. In subsequent iterations of step 202, no election process may occur since one or more other endpoints are currently functioning as endpoints. Accordingly, for subsequent iterations step 202 may include communicating with the other endpoints of the domain including the endpoint to determine whether one or more other endpoints are currently functioning as honeypots. Accordingly, an endpoint that is currently functioning as an endpoint may indicate this to other endpoints in response to messages from the other endpoints seeking to participate in an election process. If one or more other endpoints are found to be functioning as honeypots, then step 204 will be negative, and the endpoint will again sleep 206.

In other embodiments, the election process may be repeated periodically regardless of whether one or more endpoints are already functioning as honeypots in order to randomly change which end point functions as a honeypot over time.

If the endpoint is found 204 to have been selected as part of the election process 202, the method 200 may include receiving 208 configuration data from the management server 112. For example, upon determining 204 that the endpoint has been selected, the endpoint may transmit a message to the management server 112 informing the management server 112 of the endpoint's selection. In some embodiments, this message may be transmitted over a VPN tunnel between the endpoint and the management server 112. The management server 112 may likewise transmit the configuration data over the secure channel. The channel may be implemented using any IP tunnel mechanism), TLS/SSL (transport layer security/secure sockets layer), or the like.

As noted above, the configuration data may list unused IP addresses in the domain of the endpoint, an instruction to acquire unused IP addresses in the domain of the endpoint, hostnames to associate with unused IP addresses acquired by the endpoint, an instruction to implement or simulate a network service, or any other instruction for controlling operation of the endpoint as a honeypot.

In response to receiving 208 the configuration data, the endpoint acquires 210 the unused IP addresses, which may include specific IP addresses included in the configuration data or otherwise seeking to acquire IP addresses in the domain. For example, acquiring 210 the unused IP addresses may include requesting the unused IP addresses using DHCP (dynamic host configuration protocol) or some other network configuration protocol.

Step 210 may further include configuring one or more actual or simulated network services and associating them with ports of the acquired IP addresses. The number of acquired IP addresses may be one or more. The number of acquired IP addresses may be a function of the number of honeypots in the domain of the endpoint. Where there are few honeypots, the endpoint may acquire more than if there are more. The management server 112 may determine this number for each domain.

Note that the IP addresses acquired at step 210 are in addition to one or more production IP addresses already acquired by the endpoint and using which the endpoint receives and transmits production data and performs production tasks as described above.

The endpoint may also broadcast and respond 212 to configuration traffic for the acquired IP addresses of step 210. For example, this may include broadcasting and responding to ARP (address resolution protocol) packets, Net BIOS (basic input output system) Name Service (NBNS) packets, Link-Local Multicast Name Resolution (LLMNR) packets, and Multicast Domain Name System (mDNS) packets, and dynamic host configuration protocol (DHCP) packets. Step 212 may further include sending and/or receiving browser protocol message requests for the acquired IP addresses, such as using MICROSOFT browser protocol for the hostnames associated with the acquired IP addresses. A user may also define MAC (machine access code) addresses to respond for each of the acquired IP address. Alternatively, these MAC addresses may be automatically generated by the endpoint. The broadcast of step 212 may include any hostnames assigned to the acquired IP addresses.

Broadcasting and responding 212 to configuration and traffic for the acquired IP addresses increases the visibility of the honeypot. In conventional approaches, it is difficult to deploy honeypots in large network that are visible when scanning in local networks. Using the approach described herein, any and all local networks may implement a honeypot that is highly visible.

The method 200 may include evaluating 214 whether traffic has been received that references the IP addresses acquired at step 310. In particular, external traffic from outside the domain of the endpoint may be detected. Internal or external traffic in addition to the configuration traffic of step 212 may be detected, i.e. payload data or traffic establishing or communicating over a connection to the endpoint using the acquired IP addresses.

If traffic is detected at step 214, this traffic may be forwarded 216 to the management server 112, such as over the GRE or secure tunnel. The tunnel may persist or may be created as traffic is detected and then closed after it has been forwarded. Steps 212, 214 may be performed repeatedly as long as the endpoint functions as a honeypot. The tunnel used for forwarding traffic at step 216 may be a different channel than is used for requesting and receiving configuration data at step 208. In particular, the tunnel for step 216 may be a GRE tunnel.

The method 200 may include evaluating 218 whether the endpoint has moved to a different domain. If so, the endpoint releases 220 the IP addresses acquired at step 210. For static IP assignment the step of releasing 220 the IP addresses may be performed immediately. For dynamic IP assignment, step 220 may include waiting for DHCP lease timeout, which will then permit the released IP addresses to be assigned to another endpoint.

If the endpoint is found 218 to have been moved to a different domain, the endpoint attempts to participate 202 in the election process for the different domain. As noted above, where a sufficient number of endpoints are currently functioning as honeypots, step 202 may include indicating to the endpoint that no election process is occurring. In response, the endpoint will sleep 206 for a wait period. If an election process does occur and the endpoint is elected 204, then the endpoint may then function as a honeypot in the different domain as described above with respect to steps 208-216.

Figure 3:
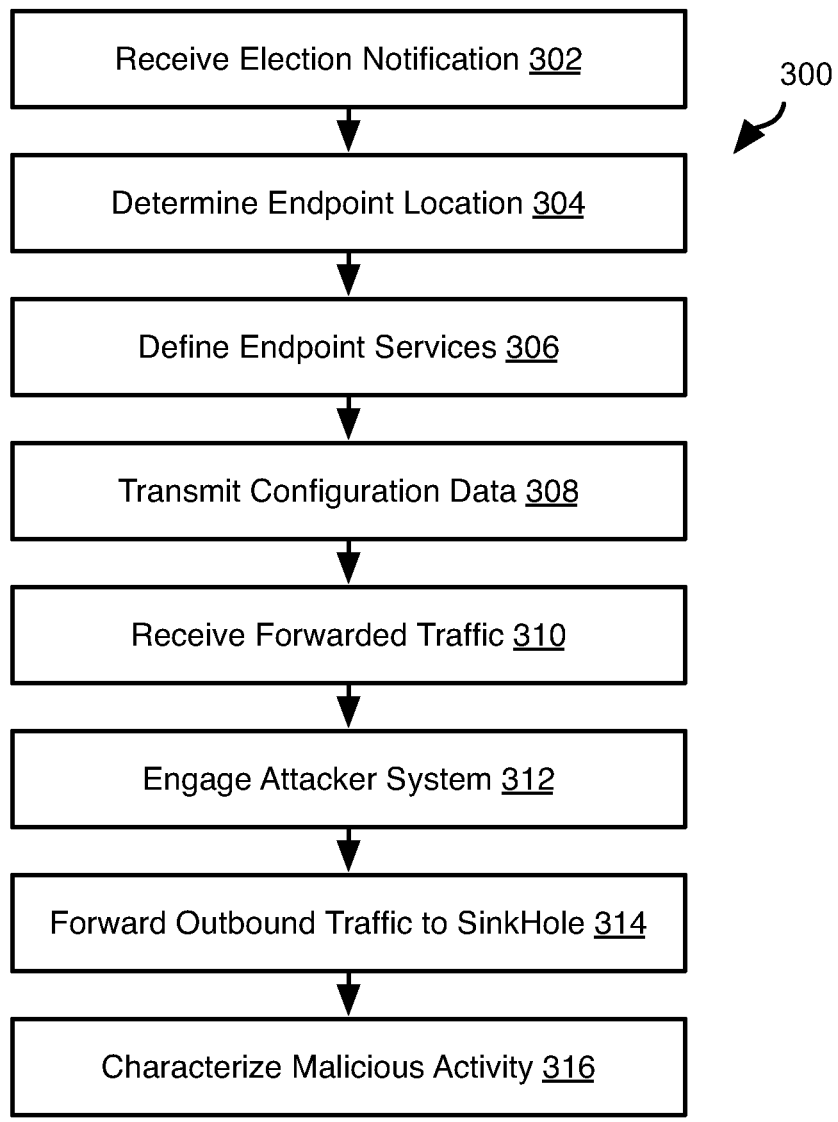
FIG. 3 is a process flow diagram of a method for interacting with decoy forwarders using a management server in accordance with an embodiment of the present invention.

Referring to FIG. 3, the illustrated method 300 may be executed by the management server 112 with respect to each endpoint that is selected to operate as a honeypot. Communication with the endpoint described with respect to the method 300 may be performed over a secure channel with the endpoint which maybe persistent or created and destroyed as it is used or unused.

The method 300 may include receiving 302 a notification from the endpoint, the notification indicating that the endpoint was selected to operate as an endpoint according to the election process in the domain including the endpoint.

In response to receiving the notification, the management server 112 determines 304 the location of the endpoint and defines 306 one or more endpoint services according to the location. Determining 304 the location may include extracting the location from the notification received at step 302. For example, the notification may include some or all of an identifier of the domain in which the endpoint is located, a GPS (global positioning system) coordinate of the endpoint, an address at which the endpoint is located, or any other identifying information. The management server 112 may access a look up table that matches IP addresses of endpoints to location information, which is retrieved at step 304 for the IP address from which the notification 302 was received.

The management server may define 306 a set of zero or more endpoint services appropriate to the location determined at step 304. For example, if the location indicates a home network or that the endpoint is connected to a home network, the set network services may be empty or may include a service that may be implemented on a home network, such as a wireless printer, media streaming service, or the like. In some embodiments, where a home network is indicated, the configuration data may instruct the endpoint to simulate operation of an IoT device. If the location indicates an office setting with many personal computers, the network services may include services that are appropriate to an office computer or server that would be present in an office setting, such as a remote login server (e.g., rlogin, SSH, etc.), wireless printer, messaging application, or any other network service that may be present in such an environment. Where the location indicates a server rack or other server-centric domain, the services may include a remote login server, web server, database server, or other enterprise network service.

The management server 112 may have a database storing the type of network vs. location or domain name, such as based on a human-provided inputs indicating a type for each domain or range of locations. Likewise, the management may be provided by human operators with templates of services corresponding to each location or type of location assigned to various domains. Alternatively, the services for each domain may be obtained by observing traffic on the each domain to determine services actually implemented in the each domain. The services defined at step 306 may therefore include one or more of the services observed for the domain of the endpoint from which the notification 302 was received.

The method 300 further includes transmitting 308 configuration data to the endpoint. The configuration data may include a listing of the services defined at step 306. The configuration data may include a listing of one or more IP addresses in the domain of the endpoint or an instruction to acquire a specified number of IP addresses in the domain of the endpoint. For example, the number of IP addresses may be from 1 to 10 addresses.

The method 300 may include receiving 310 traffic forwarded from the endpoint, i.e. traffic addressed to the addresses acquired 210 by the endpoint in response to the configuration data transmitted at step 308. The management server 112 may then process the traffic to engage 312 a potential attacker system 122. The management server 112 may engage 312 the attacker system 122 by processing the traffic using a VM 116a-116c and providing responses or executing instructions included in the traffic. In some embodiments, the management server 112 performs a state full inspection of traffic and allows inbound connections to honeypot servers, e.g. servers implementing the VMs 116a-116c. New connections originating from the VMs 116a-116c of the honeypot servers may be directed to the sinkhole 118, which can respond to the traffic using default templates or operate as a proxy to the internet 104.

For example, the VMs 116a-116c may implement network services that provide realistic responses to traffic received 310. The response may be forwarded to the endpoint, which then forwards the response to the attacker system. In particular, the endpoint may function as a proxy between the attacker system 122 and the management server 112 throughout the engagement. As noted above, where the traffic invokes outbound traffic, this traffic may be forwarded 314 to the sinkhole 118, which may process it according to simulated network services or operate as a proxy between the management server 112 and the Internet 104 or other external network.

The method by which the management server 112 engages an attacker system may include any of the approaches described in the incorporated applications. In particular, the management server 112 may implement functions ascribed to the BotSink in the incorporated applications with interaction with the attacker system 122 being performed through the endpoint.

The method 300 may include characterizing 316 malicious activity by observing the forwarded traffic and actions invoked by the traffic on the management server 112 and sinkhole 118. In particular, characterizing 316 malicious activity may include performing the functions of the Multi-Dimension Correlation Engine (MDCE) described in the incorporated applications. In particular, instructions executed by the attacker system 122 or malicious code provided by the attacker system 122 may be recorded, data that is accessed, external addresses accessed, and other attributes of the attacker system 122 and activity it invokes may be recorded and used to identify and prevent other intrusion attempts by the attacker system 122 or by malicious code similar to that provided by the attacker system 122.

Figure 4:
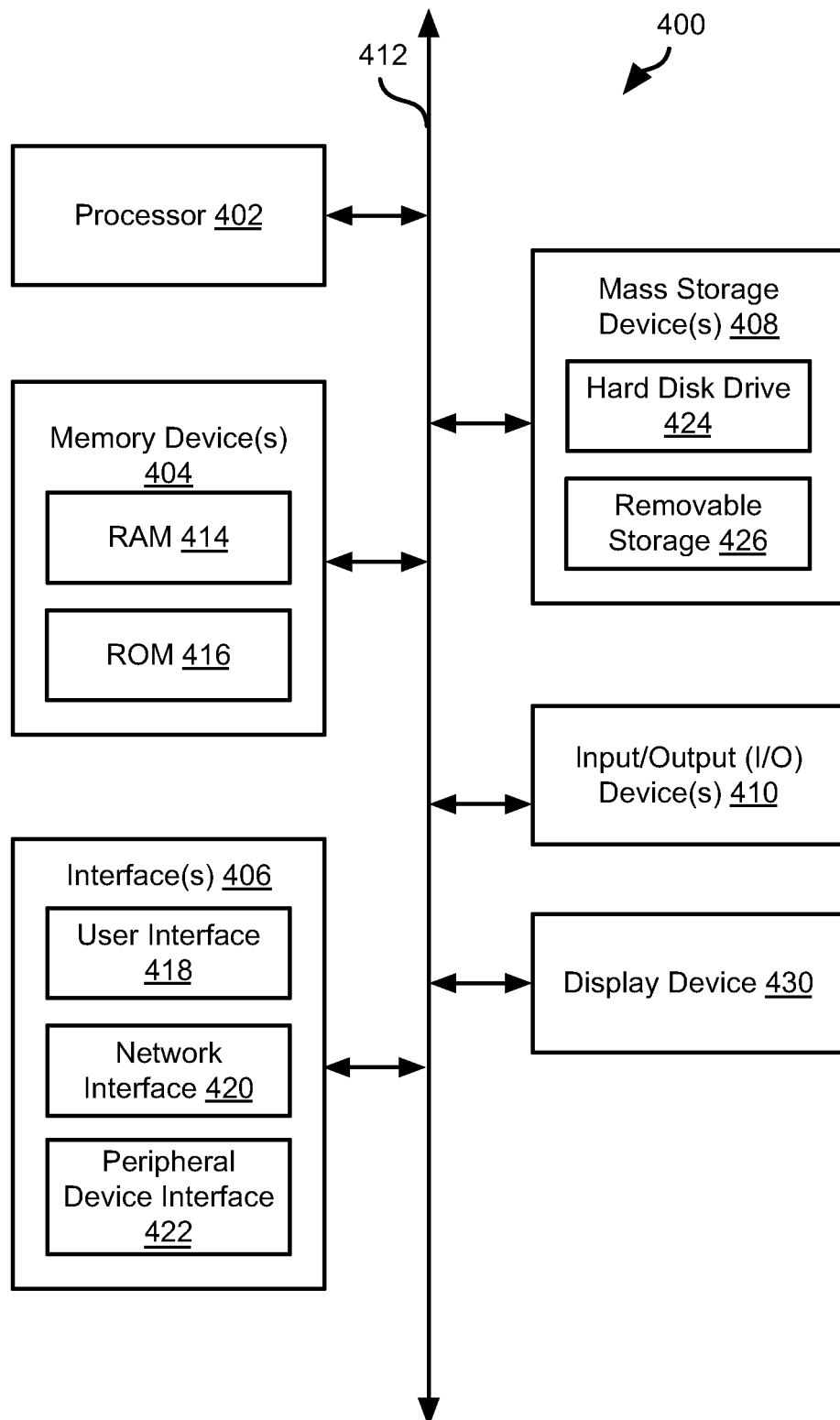
FIG. 4 is a schematic block diagram of a computer system suitable for implementing methods in accordance with embodiments of the present invention.

FIG. 4 is a block diagram illustrating an example computing device 400 which can be used to implement the system and methods disclosed herein. The endpoints 106*a*-106*g*, management server 112, sinkhole 118, and attacker system 122 may also have some or all of the attributes of the computing device 400. In some embodiments, a cluster of computing devices interconnected by a network may be used to implement any one or more components of the invention.

Computing device 400 may be used to perform various procedures, such as those discussed herein. Computing device 400 can function as a server, a client, or any other computing entity. Computing device can perform various monitoring functions as discussed herein, and can execute one or more application programs, such as the application programs described herein. Computing device 400 can be any of a wide variety of computing devices, such as a desktop computer, a notebook computer, a server computer, a handheld computer, tablet computer and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet.

Other interface(s) include user interface 418 and peripheral device interface 422. The interface(s) 406 may also include one or more user interface elements 418. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method for detecting unauthorized access of a network environment, the method comprising:
   providing a plurality of network domains, each domain of the plurality of network domains including one or more endpoints operating as at least one of a user-operated computer or provider of a production network service;
   for each domain of the plurality of network domains:
      providing a plurality of endpoints that are not currently functioning as honeypots, each endpoint of the plurality of endpoints being assigned a production IP address referencing the each endpoint such that production traffic referencing the production IP address is transmitted to the each endpoint and the each endpoint receives and processes the production traffic addressed to the production IP address without forwarding the production traffic to a decoy server, the each endpoint further including a forwarding module that is programmed to perform decoy IP address acquisition and traffic forwarding, the forwarding modules of the plurality of endpoints being deactivated;
      activating the forwarding modules of the plurality of endpoints and communicating among the forwarding modules of the plurality of endpoints of the each domain to determine whether any of the plurality of endpoints is functioning as a honeypot;
      (a) determining that none of the plurality of endpoints is functioning as a honeypot; and
      (a) in response to (a), selecting a selected endpoint of the plurality of endpoints to function as a honeypot while one or more other endpoints of the plurality of endpoints are not selected to function as honeypots
      in response to (b):
         deactivating the forwarding modules of the one or more other endpoints;
         acquiring, by the forwarding module of the selected endpoint, a decoy internet protocol (IP) address in the each domain such that the selected endpoint is assigned the decoy IP address and receives traffic addressed to the decoy IP address in the each domain, the decoy IP address being in addition to a production IP address referencing the selected endpoint;

receiving, by the forwarding module of the selected endpoint, additional traffic referencing the decoy IP address; and in response to receiving the additional traffic, forwarding, by the forwarding module of the selected endpoint, the additional traffic to a management server;

wherein forwarding the additional traffic to the management server comprises: establishing a tunnel to the management server; and forwarding the additional traffic through the tunnel.

2. The method of claim 1, wherein selecting the selected endpoint from the one or more endpoints comprises:

participating, by the selected endpoint, in an election process with one or more other endpoints of the each domain; and detecting, by the selected endpoint, election of the selected endpoint as a result of the election process.

3. The method of claim 1, further comprising, in response to the selecting of the selected endpoint:

transmitting, by the selected endpoint, a request to the management server for configuration data;

receiving, by the selected endpoint, the configuration data;

acquiring, by the selected endpoint, the decoy IP address in accordance with the configuration data such that the selected endpoint is assigned the decoy IP address and receives the traffic addressed to the decoy IP address in the each domain.

4. The method of claim 3, wherein the configuration data includes an instruction to simulate a network service for the decoy IP address, the method further comprising:

evaluating, by the management server, a location of the selected endpoint;

and selecting, by the management server, the network service according to the location of the selected endpoint.

5. The method of claim 1, further comprising:

detecting, by the selected endpoint, movement of the selected endpoint to a different domain of the plurality of network domains;

in response to detecting movement of the selected endpoint to the different domain releasing, by the selected endpoint, the decoy IP address; and participating, by the selected endpoint, in an election process with one or more other endpoints of the different domain.

6. The method of claim 5, further comprising:

detecting, by the selected endpoint, that the selected endpoint was not selected during the election process; and in response to detecting that the selected endpoint was not selected, refraining from acquiring a new decoy IP address for the different domain.

7. The method of claim 6, further comprising, repeatedly and periodically participating, by the selected endpoint, in the election process for the different domain.

8. The method of claim 1, further comprising:

at least one of receiving and transmitting network configuration traffic for the decoy IP address.

9. The method of claim 8, wherein the receiving and transmitting the network configuration traffic for the decoy IP address includes participating in local discovery using at least one of a multicast and broadcast network protocol referencing the decoy IP address.

10. The method of claim 1, wherein
the tunnel is a secure tunnel to the management server.

11. A system for detecting unauthorized access of a network environment, the system comprising:

a plurality of network domains, each domain of the plurality of network domains including one or more endpoints operating as at least one of a user-operated computer or provider of a production network service, each endpoint comprising one or more processors and one or more memory devices storing executable code effective to cause the one or more processors to:

host a forwarding module configured to perform decoy IP acquisition and traffic forwarding;

maintain the forwarding module in a deactivated state for a wait period and activate the forwarding module upon expiration of the wait period to evaluate whether (a) selection of the each endpoint as a honeypot has occurred;

if (a):

acquire, by the forwarding module, a decoy internet protocol (IP) address in the domain in which the each endpoint is located such that traffic addressed to the decoy IP address is routed to the each endpoint, the decoy IP address being acquired in addition to a production IP address referencing the selected endpoint and using which production traffic is routed to and from the selected endpoint;

if production traffic is received referencing the production IP address, process the production traffic without forwarding the production traffic to a management server;

evaluate, by the forwarding module, whether (b) additional traffic referencing the decoy IP address has been received by the each endpoint; and if (b), forward, by the forwarding module, the additional traffic to a management server;

if not (a):

(c) deactivate the forwarding module for the wait period and after expiration of the wait period, evaluate, by the forwarding module, (d) whether an election process is occurring;

(e) when (d) is true at (c), participate, by the forwarding module, in the election process for the selected domain;

(f) evaluate, by the forwarding module, whether (a) has become true as a result of participation in the selection process at (e); and (g) when (a) is not true at (f), repeat steps (c), (e), (f), and (g), otherwise acquire, by the forwarding module, a second decoy IP address and forward any traffic referencing the second decoy IP address to the management server;

wherein the executable code is further effective to cause the one or more processors to forward the additional traffic to the management server by:

establishing a tunnel to the management server; and forwarding the additional traffic through the tunnel.

12. The system of claim 11, wherein the executable code is further effective to cause the one or more processors to evaluate (a) by:

participating in an election process with one or more other endpoints of the domain including the each endpoint; and evaluate whether a result of the election process includes selection of the each endpoint.

13. The system of claim 11, wherein the executable code is further effective to cause the one or more processors to, when (a):
transmit a request to the management server for configuration
data; receive the configuration data; and
acquire the decoy IP address in accordance with the configuration data.

14. The system of claim 13, wherein the configuration data includes at least one of an instruction to associate a hostname with the decoy IP address and an instruction to simulate a network service for the decoy IP address based on a location of the each endpoint.

15. The system of claim 11, wherein the executable code is further effective to cause the one or more processors to:
evaluate whether (c), movement of the selected endpoint to a different domain of the plurality of network domains;
if(c)
release the decoy IP address; and participate in an election process with one or more other endpoints of the different domain.

16. The system of claim 15, wherein the executable code is further effective to cause the one or more processors to:
if not (a), refraining from acquiring a new decoy IP address for the different domain.

17. The system of claim 11, wherein the executable code is further effective to cause the one or more processors to, when (a):
at least one of receive and transmit network configuration traffic for the decoy IP address.

18. The system of claim 17, wherein the executable code is further effective to cause the one or more processors to at least one of receive and transmit the network configuration traffic for the decoy IP address by participating in local discovery using at least one of a multicast and broadcast network protocol referencing the decoy IP address.

19. The system of claim 11, wherein
the tunnel is one of a generic routing encapsulation (GRE) tunnel and a secure tunnel.

* * * * *